Oct. 7, 1924.
J. PICHLER
1,511,137
FRUIT PEELING MACHINE
Filed Feb. 13, 1924
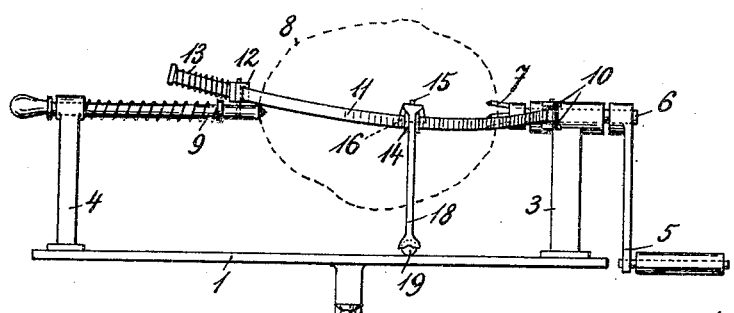
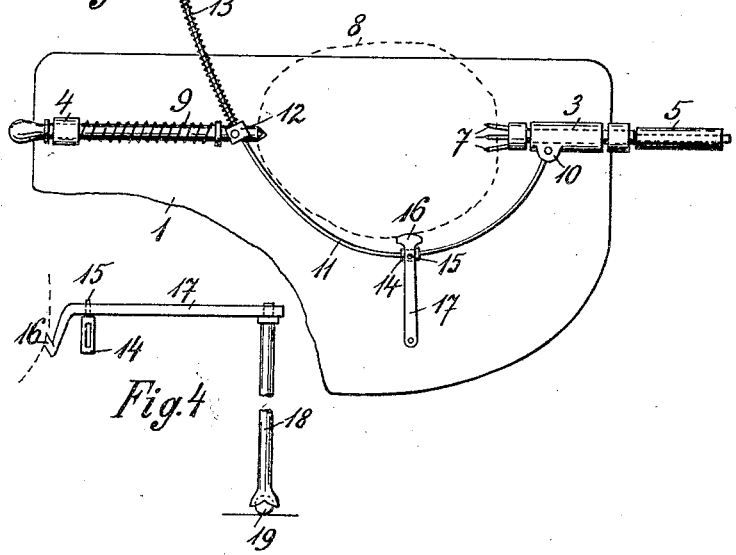
Inventor:
Josef Pichler

Patented Oct. 7, 1924.

1,511,137

UNITED STATES PATENT OFFICE.

JOSEF PICHLER, OF MILLSTATT, AUSTRIA.

FRUIT-PEELING MACHINE.

Application filed February 13, 1924. Serial No. 692,530.

*To all whom it may concern:*

Be it known that I, JOSEF PICHLER, a citizen of the Austrian Republic, residing in Millstatt-am-See, Austria, have invented certain new and useful Improvements in Fruit-Peeling Machines, of which the following is a specification.

This invention relates to fruit peeling machines.

In fruit peeling machines hitherto used the cutter as a rule cannot readily adapt itself to the irregularities of the surface of the fruit, whereby a lack of uniformity of the peeling of the fruit results, and supplementary peeling by hand is necessary.

In the devices referred to the cutter, which is controlled by spring action, is usually so mounted as to permit it to pivot on a stud or pin so that the said cutter is applied at different angles, whereby perfect peeling is impaired.

These disadvantages are effectually avoided in the present appliance by so arranging the cutter that it can slide longitudinally on a flexible support or spring which at one end is pivotally mounted upon or hinged to its support while at the other end it projects through a slotted guide and is subjected to the action of a second spring which tends to stretch or expand the flat spring whereby the knife is always slightly pressed against the fruit.

Drawings are appended illustrating one form of device according to this invention, in which:—

Fig. 1 is a front elevation,
Fig. 2 is a plan,
Fig. 3 shows a detail and
Fig. 4 shows a side view of the cutter.

The machine comprises a base plate 1 which may be fixed to a table top, or the like, by means of a clamping screw 2. Fixed on the base plate 1 are two bearings or standards 3 and 4 of which standard 3 serves as a bearing for a shaft or spindle 6, provided with a hand crank 5, and which spindle 6 at its inner end is provided with catches or carriers 7 for holding the fruit 8. 9 indicates a spindle surrounding which is a spring and which spindle is arranged so that it is slidable longitudinally in the standard 4, in alignment with spindle 6 said spindle being arranged and being pointed at its inner end to engage and assist in supporting the fruit, the spindle is pressed inwards towards the fruit by the spring.

Pivotally mounted at one end to the lugs or projections 10 on the standard 3 is a flat band spring 11 extending from one standard to another and having its free end projecting through a slot $12^1$ of a head piece 12 fixed, so as to be free to pivot, on the spindle 9, Fig. 3. Between the latter and the free end of the flat spring band 11 a helical spring 13 is slid upon the flat spring band 11 so as to tend to expand this spring band.

The spring band 11 has upon it between its two bearings a sliding piece 14 provided with a vertical stud 15 carrying the knife 16. This is provided with a handle 17 from which a support 18 extends downwards, resting by means of a ball 19 on the base plate 1.

In operation the fruit is rotated by means of the hand crank 5, and the cutter is held by the handle 17 and slowly pushed along the flat band spring 11, while its support or foot 18 slides on the base plate 1.

Owing to the fact that the cutter is moved by the flat band spring, parallel to itself, towards the fruit, the cutting angle at which the cutter attacks it remains always the same no matter whether small or large fruits are peeled.

As the cutter is, so to speak, movable to all sides it is possible to effectively peel fruit or vegetables, such as, for instance, potatoes, which have many indentations on their surface.

Claims:

1. A fruit peeling machine comprising means for supporting one end of the fruit, means for supporting the other end of the fruit, means for rotating the fruit, a flexible support extending between said fruit supporting means, means for urging said flexible support towards the fruit and a hand guided cutter movable along said flexible support.

2. A fruit peeling machine comprising means for supporting one end of the fruit, means for supporting the other end of the fruit, means for rotating the fruit, a laterally flexible body, a pivotal connection at one end of said body to a fixed body, a body revolubly mounted upon the second fruit support, a slot in said body for the passage of the other end of the flexible supporting body and a spring actuating upon said flexible support to urge same towards the fruit, a slide upon said flexible body, a cutter pivotally mounted upon said slide, a handle in said slide for moving said cutter along the flexible body.

3. A fruit peeling machine comprising means for supporting one end of the fruit, means for supporting the other end of the fruit, means for rotating the fruit, a laterally flexible body, a pivotal connection at one end of said body to a fixed body, a body revolubly mounted upon the second fruit support, a slot in said body for the passage of the other end of the flexible supporting body and a spring actuating upon said flexible support to urge same towards the fruit, a slide upon said flexible body, a cutter pivotally mounted upon said slide, a handle in said slide for moving said cutter along the flexible body, and a foot or support for said cutter bearing body during its movement along the flexible support.

4. A fruit peeling machine comprising a base, a standard on said base, a spindle revoluble in a bearing on said standard, a handle for revolving said spindle, a second standard, a bearing on said standard, a spindle slidable on said bearing, a spring opposing said sliding movement, means upon the inner ends of said spindle for engaging the fruit, a flexible body, a pivotal connection for said body upon said first standard, a body slotted for the passage of the flexible body revolubly mounted upon the second spindle, a spring acting upon said flexible body to urge it towards the fruit, a cutter slidable upon said flexible body, a handle for operating said cutter, a support for said cutter extending therefrom to the base of the machine.

In testimony whereof I have hereunto set my hand this 28th day of January A. D. 1924.

JOSEF PICHLER.

In the presence of—
CARL COUSTENBURG,
Ing. RUDOLF NESTIAN.